(12) United States Patent
Lee et al.

(10) Patent No.: US 11,457,199 B2
(45) Date of Patent: Sep. 27, 2022

(54) METHOD FOR PROCESSING IMMERSIVE VIDEO AND METHOD FOR PRODUCING IMMVERSIVE VIDEO

(71) Applicants: ELECTRONICS AND TELECOMMUNICATIONS RESEARCH INSTITUTE, Daejeon (KR); Poznan University of Technology, Poznan (PL)

(72) Inventors: Gwang Soon Lee, Daejeon (KR); Jun Young Jeong, Daejeon (KR); Dawid Mieloch, Poznan (PL); Adrian Dziembowski, Poznan (PL); Marek Domanski, Poznan (PL)

(73) Assignees: ELECTRONICS AND TELECOMMUNICATIONS RESEARCH INSTITUTE, Daejeon (KR); Poznan University of Technology, Poznan (PL)

( * ) Notice: Subject to any disclaimer, the term of this patent is extended or adjusted under 35 U.S.C. 154(b) by 0 days.

(21) Appl. No.: 17/354,985

(22) Filed: Jun. 22, 2021

(65) Prior Publication Data
US 2022/0007000 A1      Jan. 6, 2022

(30) Foreign Application Priority Data

Jun. 22, 2020 (KR) .......... 10-2020-0075708
Jun. 29, 2020 (KR) .......... 10-2020-0079143
Jun. 18, 2021 (KR) .......... 10-2021-0079574

(51) Int. Cl.
*H04N 13/178* (2018.01)
*H04N 13/128* (2018.01)
(Continued)

(52) U.S. Cl.
CPC ......... *H04N 13/178* (2018.05); *H04N 13/128* (2018.05); *H04N 13/161* (2018.05)

(58) Field of Classification Search
None
See application file for complete search history.

(56) References Cited

U.S. PATENT DOCUMENTS

2012/0122062 A1    5/2012  Fang et al.
2014/0198976 A1*   7/2014  Coffman .............. G06T 7/593
                                           382/154
(Continued)

FOREIGN PATENT DOCUMENTS

KR        101366249 B1      2/2014
KR        101969932 B2      4/2019
WO    WO2021214395 A1 *    10/2021

OTHER PUBLICATIONS

"Working Draft 5 of Immersive Video", ISO/IEC JTC 1/SC 29/WG 11, Coding of moving pictures and audio, Jun. 6, 2020.

*Primary Examiner* — Christopher Braniff

(57) ABSTRACT

An immersive video processing method according to the present invention includes: classifying view videos into a base video and an additional video; performing pruning for the view videos by referring to a result of the classification; generating an atlas based on a result of the pruning; determining a depth parameter of each view in the atlas; and encoding information indicating whether or not updating of the depth parameter is needed, based on whether or not the depth parameter of each view in the atlas is identical as in a previous atlas.

10 Claims, 17 Drawing Sheets

(51) Int. Cl.
*H04N 13/161* (2018.01)
*H04N 19/587* (2014.01)
*H04N 19/597* (2014.01)

(56) References Cited

U.S. PATENT DOCUMENTS

2014/0341292 A1* 11/2014 Schwarz ............... H04N 13/128
375/240.16
2015/0317057 A1   11/2015 Choi et al.
2020/0068184 A1*  2/2020 Shadik ................. H04N 13/161

* cited by examiner

| | Descriptor |
|---|---|
| atlas_tile_header( ) { | |
|   ath_atlas_frame_parameter_set_id | ue(v) |
|   ath_atlas_adaptation_parameter_set_id | ue(v) |
|   ath_id | u(v) |
|   ath_type | ue(v) |
|   if( afps_output_flag_present_flag ) | |
|     ath_atlas_output_flag | u(1) |
|   ath_atlas_frm_order_cnt_lsb | u(v) |
|   if( asps_num_ref_atlas_frame_lists_in_asps > 0 ) | |
|     ath_ref_atlas_frame_list_sps_flag | u(1) |
|   if( ath_ref_atlas_frame_list_sps_flag == 0) | |
|     ref_list_struct( asps_num_ref_atlas_frame_lists_in_asps ) | |
|   else if( asps_num_ref_atlas_frame_lists_in_asps > 1 ) | |
|     ath_ref_atlas_frame_list_idx | u(v) |
|   for( j = 0; j < NumLtrAtlasFrmEntries; j++ ) { | |
|     ath_additional_afoc_lsb_present_flag[j] | u(1) |
|     if( ath_additional_afoc_lsb_present_flag[j]) | |
|       ath_additional_afoc_lsb_val[j] | u(v) |
|   } | |
|   if( ath_type != SKIP_TILE ) { | |
|     if( asps_normal_axis_limits_quantization_enabled_flag ){ | |
|       ath_pos_min_z_quantizer | u(5) |
|       if( asps_normal_axis_max_delta_value_enabled_flag ) | |
|         ath_pos_delta_max_z_quantizer | u(5) |
|     } | |
|     ath_depth_range_change_flag | u(1) |
|     if( ath_depth_range_change_flag ){ | |
|       ath_original_depth_range_start | u(16) |
|       ath_original_depth_range_end | u(16) |
|     } | |
|   } | |
|   byte_alignment() | |
| } | |

FIG. 7

FIG. 11
 
(a)  (b)

FIG. 12
 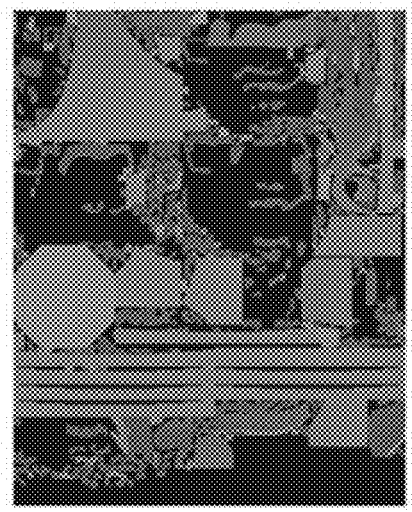
(a) (b)

Mandatory content — Proposal vs. Low/High-bitrate Anchors

| Sequence | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR | Pixel rate ratio |
|---|---|---|---|---|---|---|---|---|
| ClassroomVideo SA | -3.4% | -8.9% | 3.39 | -3.0% | -9.9% | -6.8% | -10.6% | 0.63 |
| TechnicolorMuseum SB | 25.5% | 16.0% | 14.10 | 24.4% | 12.1% | 2.5% | 1.4% | 0.63 |
| InterdigitalHijack SC | -0.5% | 0.9% | 12.33 | 0.1% | 1.2% | 1.4% | 1.9% | 0.63 |
| OrangeKitchen SJ | 20.4% | 12.9% | 15.26 | 30.4% | 12.4% | -6.1% | -7.6% | 0.62 |
| TechnicolorPainter SD | -31.8% | -33.6% | 7.04 | -31.7% | -33.6% | -32.5% | -34.2% | 0.63 |
| IntelFrog SE | -0.4% | -2.6% | 12.41 | -0.2% | -3.4% | -4.9% | -5.2% | 0.62 |
| PoznanFencing SL | -25.4% | -23.3% | 15.06 | -24.1% | -22.3% | -26.0% | -24.6% | 0.52 |
| MIV | -2.2% | -5.5% | 11.37 | -0.6% | -6.2% | -10.3% | -11.3% | |

Optional content — Proposal vs. Low/High-bitrate Anchors

| Sequence | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR | Pixel rate ratio |
|---|---|---|---|---|---|---|---|---|
| NokiaChess SN | -14.7% | -7.7% | 16.99 | -16.0% | -3.8% | -5.3% | -2.6% | 0.63 |
| PoznanCarpark SP | -19.3% | -20.8% | 12.85 | -20.9% | -21.8% | -21.9% | -22.8% | 0.52 |
| PoznanHall ST | -11.2% | -10.9% | 14.82 | -11.4% | -11.1% | -11.9% | -11.4% | 0.52 |
| PoznanStreet SU | -15.9% | -18.4% | 12.98 | -17.6% | -19.8% | -18.3% | -19.8% | 0.52 |
| MIV | -15.3% | -14.4% | 14.41 | -16.5% | -14.1% | -14.3% | -14.1% | |

FIG. 13

Mandatory content - Proposal vs.Low/High-bitrate Anchors

| Sequence | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR | Pixel rate ratio |
|---|---|---|---|---|---|---|---|---|
| ClassroomVideo | 0.7% | 0.9% | 3.38 | 0.5% | 0.9% | 1.4% | 1.3% | 0.63 |
| TechnicolorMuseum | -5.9% | -4.7% | 14.40 | -5.8% | -3.0% | 0.5% | 1.8% | 0.63 |
| InterdigitalHijack | -8.1% | -1.1% | 12.33 | -6.3% | 2.0% | 8.4% | 12.0% | 0.63 |
| OrangeKitchen | 0.0% | 0.0% | 15.43 | 0.0% | 0.0% | 0.0% | 0.0 | 0.62 |
| TechnicolorPainter | 0.0% | 0.0% | 7.01 | 0.0% | 0.0% | 0.0% | 0.0% | 0.63 |
| IntelFrog | 18.7% | 15.9% | 23.53 | 21.2% | 16.3% | 22.7% | 17.9% | 0.62 |
| PoznanFencing | 0.0% | 0.0% | 15.15 | 0.0% | 0.0% | 0.0% | 0.0% | 0.52 |
| MIV | 0.8% | 1.6% | 13.03 | 1.4% | 2.3% | 4.7% | 4.7% | |

Optional content - Proposal vs.Low/High-bitrate Anchors

| | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR | Pixel rate ratio |
|---|---|---|---|---|---|---|---|---|
| NokiaChess | -46.1% | -38.8% | 18.36 | -49.7% | -30.2% | -12.3% | -6.8% | 0.63 |
| PoznanCarpark | 0.4% | 0.4% | 12.88 | 0.5% | 0.4% | 0.4% | 0.3% | 0.52 |
| PoznanHall | 34.3% | 32.0% | 14.80 | 34.9% | 32.1% | 35.7% | 33.1% | 0.52 |
| PoznanStreet | 8.9% | 9.1% | 13.01 | 8.6% | 9.0% | 9.0% | 9.0% | 0.52 |
| MIV | -0.5% | 0.7% | 14.76 | -1.4% | 2.8% | 8.2% | 8.9% | |

FIG. 14

| Mandatory content - Proposal vs.Low/High-bitrate Anchors | | | | | | | |
|---|---|---|---|---|---|---|---|
| Sequence | High-BR BD rate Y-PSNR | Low-BR BD rate Y-PSNR | Max delta Y-PSNR | High-BR BD rate VMAF | Low-BR BD rate VMAF | High-BR BD rate IV-PSNR | Low-BR BD rate IV-PSNR | Pixel rate ratio |
| ClassroomVideo SA | 0.7% | 0.9% | 3.38 | 0.5% | 0.9% | 1.4% | 1.3% | 0.63 |
| TechnicolorMuseum SB | -5.9% | -4.7% | 14.40 | -5.8% | -3.0% | 0.5% | 1.8% | 0.63 |
| InterdigitalHijack SC | -8.1% | -1.1% | 12.33 | -6.3% | 2.0% | 8.4% | 12.0% | 0.63 |
| OrangeKitchen SJ | 0.0% | 0.0% | 15.43 | 0.0% | 0.0% | 0.0% | 0.0 | 0.62 |
| TechnicolorPainter SD | -31.8% | -33.6% | 7.04 | -31.7% | -33.6% | -32.5% | -34.2% | 0.63 |
| IntelFrog SE | -0.4% | -2.6% | 12.41 | -0.2% | -3.4% | -4.9% | -5.2% | 0.62 |
| PoznanFencing SL | -25.4% | -23.3% | 15.06 | -24.1% | -22.3% | -26.0% | -24.6% | 0.52 |
| MIV | -10.1% | -9.2% | 11.44 | -9.6% | -8.5% | -7.6% | -7.0% | |

| Optional content - Proposal vs.Low/High-bitrate Anchors | | | | | | | |
|---|---|---|---|---|---|---|---|
| NokiaChess SN | -46.1% | -38.8% | 18.36 | -49.7% | -30.2% | -12.3% | -6.8% | 0.63 |
| PoznanCarpark SP | -19.3% | -20.8% | 12.85 | -20.9% | -21.8% | -21.9% | -22.8% | 0.52 |
| PoznanHall ST | -11.2% | -10.9% | 14.85 | -11.4% | -11.1% | -11.9% | -11.4% | 0.52 |
| PoznanStreet SU | -15.9% | -18.4% | 12.98 | -17.6% | -19.8% | -18.3% | -19.8% | 0.52 |
| MIV | -23.1% | -22.2% | 14.75 | -24.9% | -20.7% | -16.1% | -15.2% | |

FIG. 15

| | Descriptor |
|---|---|
| aaps_miv_extension( ) { | |
|   aame_miv_view_params_list_update_mode | u(2) |
|   if( aame_miv_view_params_list_update_mode == VPL_INITLIST ) | |
|     aame_omaf_v1_compatible_flag | u(1) |
|     miv_view_params_list( ) | |
|   else if( aame_miv_view_params_list_update_mode == VPL_UPD_EXT ) | |
|     miv_view_params_update_extrinsics( ) | |
|   else if( aame_miv_view_params_list_update_mode == VPL_UPD_INT ) | |
|     miv_view_params_update_intrinsics( ) | |
|   else if( aame_miv_view_params_list_update_mode == VPL_EXT_INT ) { | |
|     miv_view_params_update_extrinsics( ) | |
|     miv_view_params_update_intrinsics( ) | |
|   else if( aame_miv_view_params_list_update_mode == VPL_UPD_DQUANT ) | |
|     miv_view_params_update_depth_quantization( ) | |
|   } | |
|   aame_vui_params_present_flag | u(1) |
|   if( aame_vui_params_present_flag ) | |
|     vui_parameters( ) | |
| } | |

| miv_view_params_update_depth_quantization( ) : | Descriptor |
|---|---|
| mvpui_num_view_updates_minus1 | u(16) |
| for( i = 0; i <= mvpui_num_view_updates_minus1; i++ ) { | |
| mvpui_view_idx[ i ] | u(16) |
| depth_quantization ( mvpui_view_idx[ i ] ) | |
| } | |
| } | |

FIG. 18

| depth_quantization( v ) { | Descriptor |
|---|---|
| dq_quantization_law[ v ] | u(8) |
| if( dq_quantization_law[ v ] == 0 ) | |
| dq_norm_disp_low[ v ] | fl(32) |
| dq_norm_disp_high[ v ] | fl(32) |
| } | |
| dq_depth_occ_threshold_default[ v ] | ue(v) |
| } | |

METHOD FOR PROCESSING IMMERSIVE VIDEO AND METHOD FOR PRODUCING IMMVERSIVE VIDEO

CROSS REFERENCE TO RELATED APPLICATION

The present application claims priority to a KR 10-2020-0075708, filed by Jun. 22, 2020, KR 10-2020-0079143, filed by Jun. 29, 2020, KR 10-2021-0079574, filed by Jun. 18, 2021, the entire contents of which are incorporated herein for all purposes by this reference.

BACKGROUND OF THE INVENTION

Field of the Invention

The present invention relates to a method for processing/outputting an immersive video supporting motion parallax for rotational and translation motions.

Description of the Related Art

Virtual reality service evolves towards maximizing senses of immersion and realism by generating an omni-directional video in a realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) the horizontal movement, (2) the vertical rotation, (3) the vertical movement and (4) the horizontal rotation. However, most omni-directional videos based on real images are currently supporting only rotational movements. Therefore, researches on such technical fields as the acquisition and reproduction of 6 DoF omni-directional videos are actively under way.

SUMMARY

The present invention aims to provide a method of performing scaling/rescaling for a depth atlas.

The present invention aims to provide a method of updating a depth parameter dynamically according to time.

The technical objects of the present invention are not limited to the above-mentioned technical objects, and other technical objects that are not mentioned will be clearly understood by those skilled in the art through the following descriptions.

An immersive video processing method according to the present invention includes: classifying view videos into a base video and an additional video; performing pruning for the view videos by referring to a result of the classification; generating an atlas based on a result of the pruning; determining a depth parameter of each view in the atlas; and encoding information indicating whether or not updating of the depth parameter is needed, based on whether or not the depth parameter of each view in the atlas is identical as in a previous atlas.

An immersive video processing method according to the present invention may further include: when the depth parameter is updated, encoding information on the number of views of which the depth parameter is updated; and encoding index information of each of the views.

An immersive video processing method according to the present invention may further include encoding, for a view indicated by the view index information, information indicating a minimum normalized disparity value and information indicating a maximum normalized disparity value.

An immersive video processing method according to the present invention may further include scaling depth values in the atlas to a value within a predefined depth range.

In an immersive video processing method according to the present invention, the depth range may be set differently according to a type of contents.

The features briefly summarized above with respect to the present invention are merely exemplary aspects of the detailed description below of the present invention, and do not limit the scope of the present invention.

According to the present invention, when encoding/decoding a depth atlas, a bit rate may be reduced by performing scaling/rescaling for the depth atlas.

According to the present invention, rendering quality may be improved by updating a depth parameter dynamically according to time.

Effects obtained in the present invention are not limited to the above-mentioned effects, and other effects not mentioned above may be clearly understood by those skilled in the art from the following description.

BRIEF DESCRIPTION OF THE DRAWINGS

FIG. 7 is a view illustrating an example of syntax structure including scaling-related information.

FIG. 11 and FIG. 12 are views illustrating a difference according to whether a depth atlas scaling technique proposed by the present invention is applied or not.

FIG. 13 and FIG. 14 are views illustrating a change of BD-rate according to each content when depth atlas scaling is applied.

FIG. 15 is a view illustrating an experimental result of a case in which a scaled depth range is set differently according to contents.

FIG. 16 is a view illustrating an example of syntax structure including the syntax.

FIG. 17 is a view illustrating an example of miv_mive_params_update_depth_quantization structure.

FIG. 18 is a view illustrating an example of depth_quantization structure.

DETAILED DESCRIPTION

Figure 1:
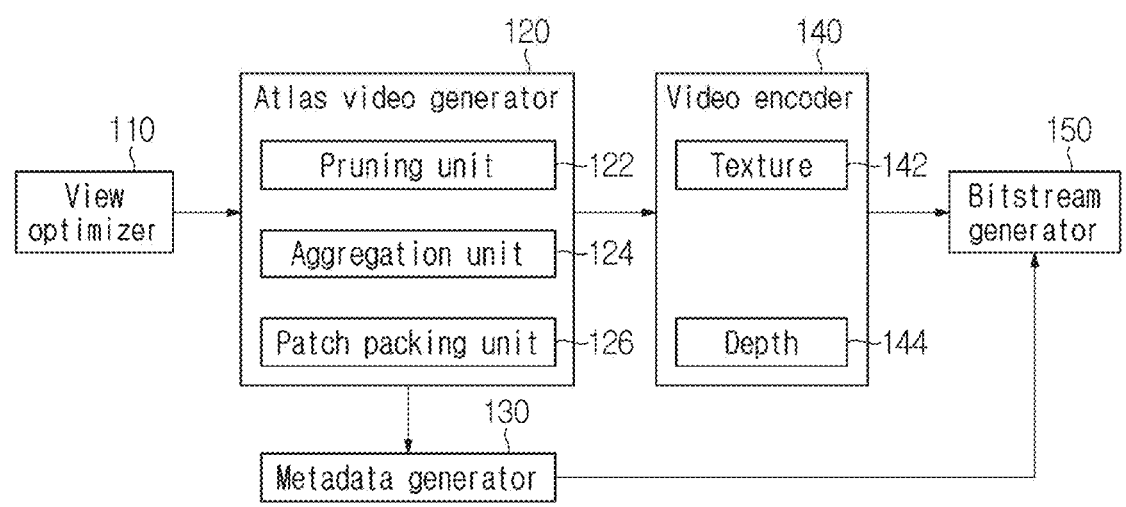
FIG. 1 is a block diagram of an immersive video processing device according to an embodiment of the present invention.

Since the present invention can have various changes and can have various embodiments, specific embodiments are illustrated in the drawings and described in detail in the detailed description. However, this is not intended to limit the present invention to specific embodiments, and it should be understood to include all modifications, equivalents and substitutes included in the spirit and scope of the present invention. Like reference numerals in the drawings refer to the same or similar functions throughout the various aspects. The shapes and sizes of elements in the drawings may be exaggerated for clearer description. Reference is made to the accompanying drawings, which illustrate specific embodiments by way of example. These embodiments are described in sufficient detail to enable those skilled in the art to practice the embodiments. It should be understood that various embodiments are different but need not be mutually exclusive. For example, certain shapes, structures, and characteristics described herein with respect to one embodiment may be embodied in other embodiments without departing from the spirit and scope of the invention. In addition, it should be understood that the location or arrangement of individual components within each invented embodiment may be changed without departing from the spirit and scope of the embodiment. Accordingly, the detailed description set forth below is not intended to be taken in a limiting sense, and the scope of exemplary embodiments, if properly described, is limited only by the appended claims, along with all scope equivalents to those as claimed.

In the present invention, terms such as first, second, etc. may be used to describe various elements, but the elements should not be limited by the terms. The above terms are used only for the purpose of distinguishing one component from another. For example, without departing from the scope of the present invention, a first component may be referred to as a second component, and similarly, a second component may also be referred to as a first component. and/or includes a combination of a plurality of related listed items or any of a plurality of related listed items.

When a component of the present invention is referred to as being "connected" or "connected" to another component, it may be directly connected or connected to the other component. It should be understood that other components may exist between the component and the another component. On the other hand, when it is mentioned that a certain element is "directly connected" or "directly connected" to another element, it should be understood that there is no other element in the middle.

Components shown in the embodiment of the present invention are shown independently to represent different characteristic functions, and it does not mean that each component is formed of separate hardware or a single software component. That is, each component is listed as each component for convenience of description, and at least two components of each component are combined to form one component, or one component can be divided into a plurality of components to perform a function, and each of these components Integrated embodiments and separate embodiments of the components are also included in the scope of the present invention without departing from the essence of the present invention.

Components shown in the embodiment of the present invention are shown independently to represent different characteristic functions, and it does not mean that each component is formed of separate hardware or a single software component. That is, each component is listed as each component for convenience of description, and at least two components of each component are combined to form one component, or one component can be divided into a plurality of components to perform a function, and each of these components Integrated embodiments and separate embodiments of the components are also included in the scope of the present invention without departing from the essence of the present invention.

The terms used in the present invention are only used to describe specific embodiments, and are not intended to limit the present invention. The singular expression includes the plural expression unless the context clearly dictates otherwise. In the present invention, terms such as "comprise" or "have" are intended to designate that a feature, number, step, operation, component, part, or a combination thereof described in the specification exists, but one or more other features It should be understood that this does not preclude the existence or addition of numbers, steps, operations, components, parts, or combinations thereof. That is, the description of "including" a specific configuration in the present invention does not exclude configurations other than the corresponding configuration, and it means that additional configurations may be included in the practice of the present invention or the scope of the technical spirit of the present invention.

Some components of the present invention are not essential components for performing essential functions in the present invention, but may be optional components for merely improving performance. The present invention can be implemented by including only essential components to implement the essence of the present invention, except for components used for performance improvement, and a structure including only essential components excluding optional components used for performance improvement Also included in the scope of the present invention.

Hereinafter, embodiment of this invention is described concretely with reference to drawings. In describing the embodiments of the present specification, if it is determined that a detailed description of a related known configuration or function may obscure the gist of the present specification, the detailed description is omitted, and the same reference numerals are used for the same components in the drawings. and repeated descriptions of the same components will be omitted.

An immersive video means a video that enables a viewport to dynamically change when a viewing position of a user changes. A multiplicity of input videos is required to realize an immersive video. Each of the multiplicity of input videos may be referred to as a source video or a view video. A different view index may be assigned to each view video.

Immersive videos may be classified into such types as 3 DoF (Degree of Freedom), 3 DoF+, Windowed-6 DoF and 6 DoF. A 3 DoF immersive video may be realized by using only a texture video. On the other hand, not only a texture video but also a depth video is required to render an immersive video including depth information like 3 DoF+ or 6 DoF.

It is assumed that the embodiments described below are directed to process an immersive video including depth information like 3 DoF+ and/or 6 DoF. Also, a view video is assumed to consist of a texture video and a depth video.

FIG. 1 is a block diagram of an immersive video processing device according to an embodiment of the present invention.

Referring to FIG. 1, an immersive video processing device according to the present invention may include a view optimizer 110, an atlas video generator 120, a metadata generator 130, a video encoder 140, and a bitstream generator 150.

The immersive video processing device encodes an immersive video by receiving multiple pair videos, an intrinsic camera variable and an extrinsic camera variable as input values. Herein, the multiple pair videos include a texture video (attribute component) and a depth video (geometry component). Each pair may have a different view. Accordingly, a pair of input videos may be referred to as a view video. Each view video may be distinguished by an index. Herein, an index assigned to each view video may be referred to as a view or a view index.

The intrinsic camera variable includes a focal length and a location of a principal point, and the extrinsic camera variable includes a camera location and a direction. The intrinsic camera variable and the extrinsic camera variable may be treated as a camera parameter or a view parameter.

The view optimizer 110 divides view videos into a multiplicity of groups. As the view videos are divided into the multiplicity of groups, independent processing of encoding may be performed in each group. As an example, view videos taken by N spatially sequential cameras may be classified into a single group. In this way, view videos with relatively coherent depth information may be bound into a single group, and rendering quality may be improved accordingly.

In addition, by removing information dependency between groups, a spatial random access service may be possible which performs rendering by bringing selectively only information on a region that a user is viewing.

Whether or not to divide view videos into a multiplicity of groups may be optional.

In addition, the view optimizer 110 may classify view videos into base videos and additional videos. A base video, which is a view video with the highest pruning priority, is an unpruned video, and an additional video is a view video with lower pruning priority than the base video.

The view optimizer 110 may determine at least one of the view videos as the base video. A view video that is not selected as the base video may be classified as an additional video.

The view optimizer 110 may determine a base video by considering the view position of a view video. As an example, among a multiplicity of view videos, a view video with the view position at its center may be selected as the base video.

Alternatively, the view optimizer 110 may select a base video based on a camera parameter. Specifically, the view optimizer 110 may select the base video based on at least one of a camera index, an order of priority among cameras, a camera position, and whether or not a camera is a ROI (Region of Interest) camera.

For example, at least one of the following view videos may be determined as a base video: a view video with a smallest camera index, a view video with a largest camera index, a view video having a same camera index as a predefined value, a view video taken through a camera with highest priority, a view video taken through a camera with lowest priority, a view video taken through a camera at a predefined position (e.g., at a center position), and a view video taken through a ROI camera.

Alternatively, the view optimizer 110 may determine a base video based on the qualities of view videos. As an example, a view video with highest quality among view videos may be determined as a base video.

Alternatively, the view optimizer 110 may examine a degree of data redundancy among view videos and then determine a base video by considering a proportion of redundant data with other view videos. As an example, a view video with a highest or lowest proportion of redundant data with other view videos may be determined as a base video.

A multiplicity of view videos may be set as base videos.

The atlas generator 120 generates a pruning mask by performing pruning. Next, a patch is extracted by using the pruning mask, and an atlas is generated by combining a base video and/or the extracted patch. When view videos are divided into a multiplicity of groups, the above process may be performed independently in each group.

An atlas thus generated may consist of a texture atlas and a depth atlas. The texture atlas represents a video combining a basic texture video and/or texture patches, and a depth atlas represents a video combining a basic depth video and/or depth patches.

The atlas generator 120 may include a pruning unit (pruner) 122, an aggregation unit (aggregator) 124 and a patch packing unit (patch packer) 126.

The pruning unit 122 performs pruning for an additional video based on a priority order of pruning. Specifically, the pruning unit 122 may perform pruning for an additional video by using a reference video that has higher pruning priority than the additional video.

The reference video includes a base video. In addition, according to the pruning priority of the additional video, the reference video may further include another additional video.

It may be selectively determined whether or not an additional video may be used as a reference video. As an example, when it is set that no additional video is used as a reference video, only a base video may be set as a reference video.

On the other hand, when it is set that an additional video may be used as a reference video, an additional video that has higher pruning priority than a base video and another additional video may be set as a reference video.

Through a pruning process, redundant data between an additional video and a reference video may be removed. Specifically, redundant data with a reference video may be removed from an additional video through a warping process based on a depth video. As an example, a depth value is compared between an additional video and a reference video, and when a difference is equal to or less than a threshold value, a corresponding pixel may be determined to be redundant data.

As a result of pruning, a pruning mask may be generated which includes information on whether each pixel in an additional video is valid or invalid. The pruning mask may be a binary video indicating whether each pixel in an additional video is valid or invalid. As an example, on a pruning mask, a pixel detected as redundant data with a reference video may have a value of 0, and a pixel not detected as redundant data with a reference video may have a value of 1.

A non-overlapping region may have a non-rectangular shape, while the shape of a patch is limited to rectangle. Accordingly, a patch may include an invalid region as well as a valid region. Herein, the valid region means a region composed of non-redundant pixels between an additional video and a reference video. That is, the valid region represents a region including data that are included in the additional video but not in the reference video. The invalid region means a region that is composed of redundant pixels between the additional video and the reference video. A pixel/data included in the valid region may be referred to as a valid pixel/valid data, and a pixel/data included in the invalid region may be referred to as an invalid pixel/invalid data.

The aggregation unit 124 combines pruning masks, which are generated in frame units, every intra-period.

In addition, the aggregation unit 124 may extract a patch from a combined pruning mask video through a clustering process. Specifically, the aggregation unit 124 may extract a rectangular region, which includes valid data in the combined pruning mask video, as a patch. As a patch is extracted in a rectangular shape irrespective of a shape of a valid region, a patch extracted from a non-rectangular valid region may include not only valid data but also invalid data.

Herein, the aggregation unit 124 may redivide an L-shaped or C-shaped patch that lowers coding efficiency. Herein, the L-shaped patch represents an L-shaped distribution of valid regions, and the C-shaped patch represents a C-shaped distribution of valid regions.

When a distribution of valid regions is L-shaped or C-shaped, an area occupied by non-valid regions within a patch is relatively large. Accordingly, coding efficiency may be improved by dividing an L-shaped or C-shaped patch into a multiplicity of patches.

As for a view video that is not pruned, the entire view video may be treated as one patch. Specifically, an entire 2D video, which develops an unpruned view video in a predetermined projection format, may be treated as a single patch. A projection format may include at least one of an equirectangular projection format (ERP), a cube map, and a perspective projection format.

Herein, the unpruned view video means a base video with highest pruning priority. Alternatively, an additional video without redundant data with a base video and a reference video may be defined as an unpruned view video. Alternatively, irrespective of whether or not there are redundant data with a reference video, an additional video that is randomly excluded from a pruning target may also be defined as an unpruned view video. That is, even when an additional video includes redundant data with a reference video, the additional video may be defined as an unpruned view video.

The packing unit 126 packs a patch into a rectangular video. Patch packing may be accompanied by transformation of a patch like scaling, rotation and flip. A video, in which patches are packed, may be defined as an atlas.

Specifically, the packing unit 126 may generate a texture atlas by packing a basic texture video and/or texture patches and generate a depth atlas by packing a basic depth video and/or depth patches.

A base video as a whole may be treated as a single patch. That is, a base video may be packed into an atlas as it is. When a video as a whole is treated as a single patch, the patch may be referred to as a complete view or a complete patch.

The number of atlases generated by the atlas generator 120 may be determined based on at least one of the arrangement of camera rigs, the accuracy of a depth map, and the number of view videos.

The metadata generator 130 generates metadata for video synthesis. The metadata may include at least one of camera-related data, pruning-related data, atlas-related data and patch-related data.

Pruning-related data include information for determining a priority order of pruning among view videos. As an example, at least one of a flag indicating whether or not a view video is a root node and a flag indicating whether or not a view video is a leaf node may be encoded. A root node represents a view video with highest pruning priority (that is, base video), and a leaf node represents a view video with lowest pruning priority.

When a view video is not a root node, a parent node index may be additionally encoded. The parent node index may represent a video index of a view video that is a parent node.

Alternatively, when a view video is not a leaf node, a child node index may be additionally encoded. The child node index may represent a video index of a view video that is a child node.

Atlas-related data may include at least one of information on atlas size, information on the number of atlases, information on a priority order among atlases, and a flag indicating whether or not an atlas includes a complete video. A size of an atlas may include at least one of size information of a texture atlas and size information of a depth atlas. A flag indicating whether or not the size of the depth atlas is equal to the size of the texture atlas may be additionally encoded. When the size of the depth atlas is different from the size of the texture atlas, information on a downscaling ratio of the depth atlas (e.g., scaling-related information) may be additionally encoded. Atlas-related information may be included in "View parameters list" in a bitstream.

The syntax geometry_scale_enabled_flag, which indicates whether or not downscaling a depth atlas is permitted, may be encoded/decoded. When the syntax geometry_scale_enabled_flag has a value of 0, downscaling a depth atlas is not permitted. In this case, the depth atlas has a same size as a texture atlas.

When the syntax geometry_scale_enabled_flag has a value of 1, downscaling a depth atlas is permitted. In this case, information for determining a downscaling ratio of the depth atlas may be additionally encoded/decoded. As an example, the syntax geometry_scaling_factor_x indicating a downscaling ratio of a depth atlas in the horizontal direction and the syntax geometry_scaling_factor_y indicating a downscaling ratio of the depth atlas in the vertical direction may be additionally encoded/decoded.

In an immersive video output apparatus, after information on a downscaling ratio of a depth atlas is decoded, a downscaled depth atlas may be restored to an original size.

Patch-related data include a position and/or size of a patch in an atlas video, a view video to which a patch belongs, and information for specifying a position and/or size of a patch in a view video. As an example, at least one of positional information indicating a position of a patch in an atlas video and size information indicating a size of a patch in an atlas video may be encoded. In addition, a source index for identifying a view video, from which a patch originates, may be encoded. A source index represents an index of a view video that is an original source of a patch. In addition, positional information indicating a position corresponding to a patch in a view video or size information indicating a size corresponding to a patch in a view video may be encoded. Patch-related information may be included in an "Atlas data" item within a bitstream.

The video encoder 140 encodes an atlas. When view videos are classified into a multiplicity of groups, an atlas may be generated in each group. Accordingly, video encoding may be performed independently in each group.

The video encoder 140 may include a texture video encoder 142 for encoding a texture atlas and a depth video encoder 144 for encoding a depth atlas.

The bitstream generator 150 generates a bitstream based on encoded video data and metadata. A bitstream thus generated may be transmitted to an immersive video output device.

Figure 2:
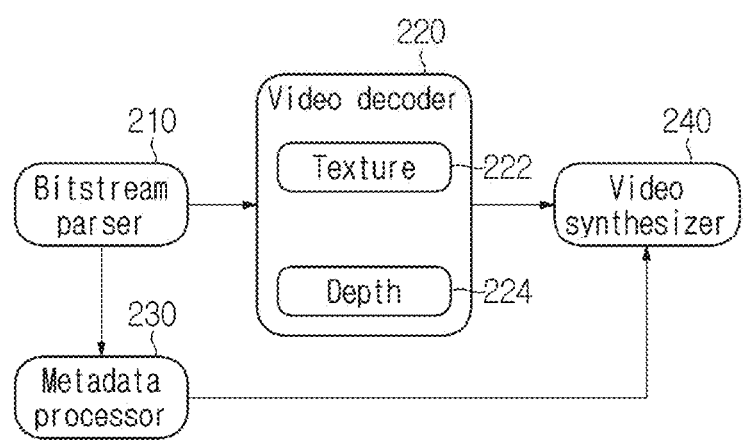
FIG. 2 is a block diagram of an immersive video output device according to an embodiment of the present invention.

FIG. 2 is a block diagram of an immersive video output device according to an embodiment of the present invention.

Referring to FIG. 2, an immersive video output device according to the present invention may include a bitstream parsing unit (parser) 210, a video decoder 220, a metadata processor 230 and a video synthesizer 240.

The bitstream parsing unit 210 parses video data and metadata from a bitstream. Video data may include data of an encoded atlas. When a spatial random access service is supported, only a partial bitstream including a viewing position of a user may be received.

The video decoder 220 decodes parsed video data. The video decoder 220 may include a texture video decoder 222 for decoding a texture atlas and a depth video decoder 224 for decoding a depth atlas.

A metadata processor 230 unformats parsed metadata.

Unformatted metadata may be used to synthesize a video of a specific view. As an example, when a user's movement information is input into the immersive video output device, the metadata processor 230 may determine an atlas necessary for video synthesis, patches necessary for video synthesis and/or the positions/sizes of the patches in an atlas in order to reproduce a viewport video according to the user movement.

The video synthesizer 240 may dynamically synthesize a viewport video according to the user movement. Specifically, the video synthesizer 240 may extract patches necessary to synthesize a viewport video from an atlas by using information that is determined in the metadata processor 230 according to the user movement. Specifically, the viewport video may be generated by extracting an atlas, which includes information on a view video necessary to synthesize the viewport video, and patches that are extracted from the view video in the atlas, and by synthesizing the extracted patches.

Figure 3:
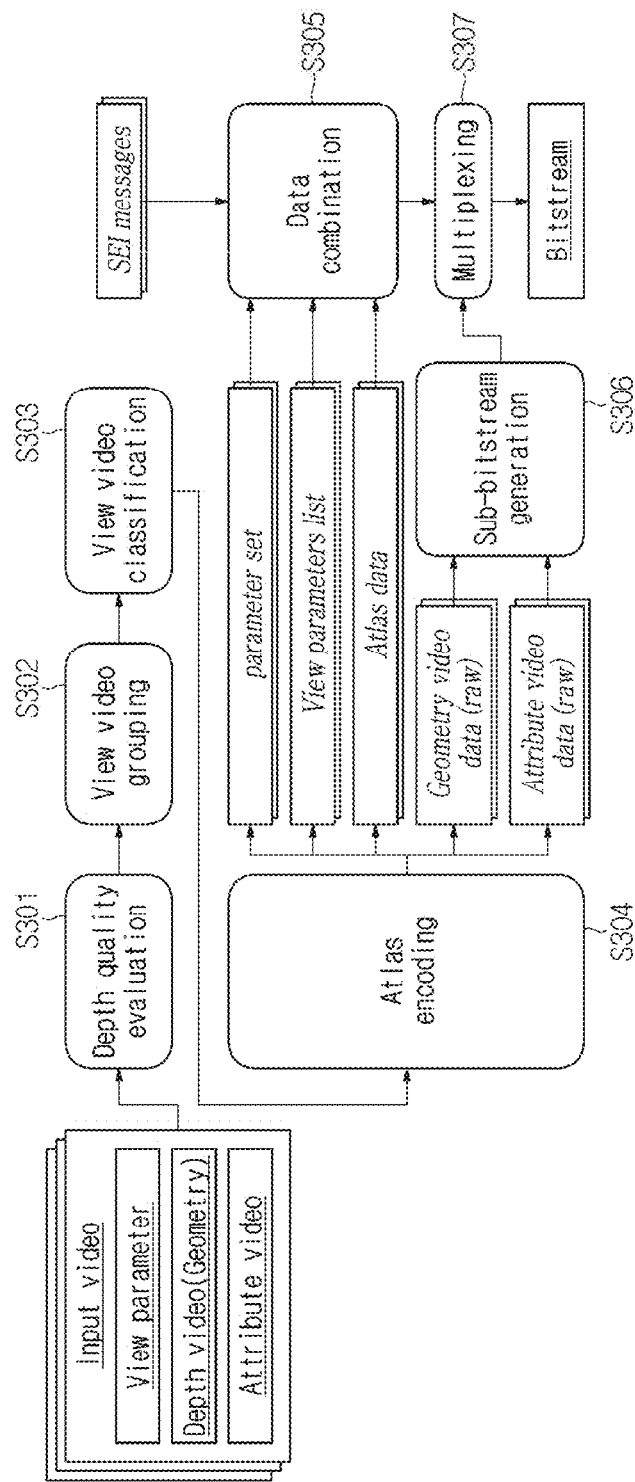
FIG. 3 is a flowchart illustrating an immersive video processing method.
Figure 5:
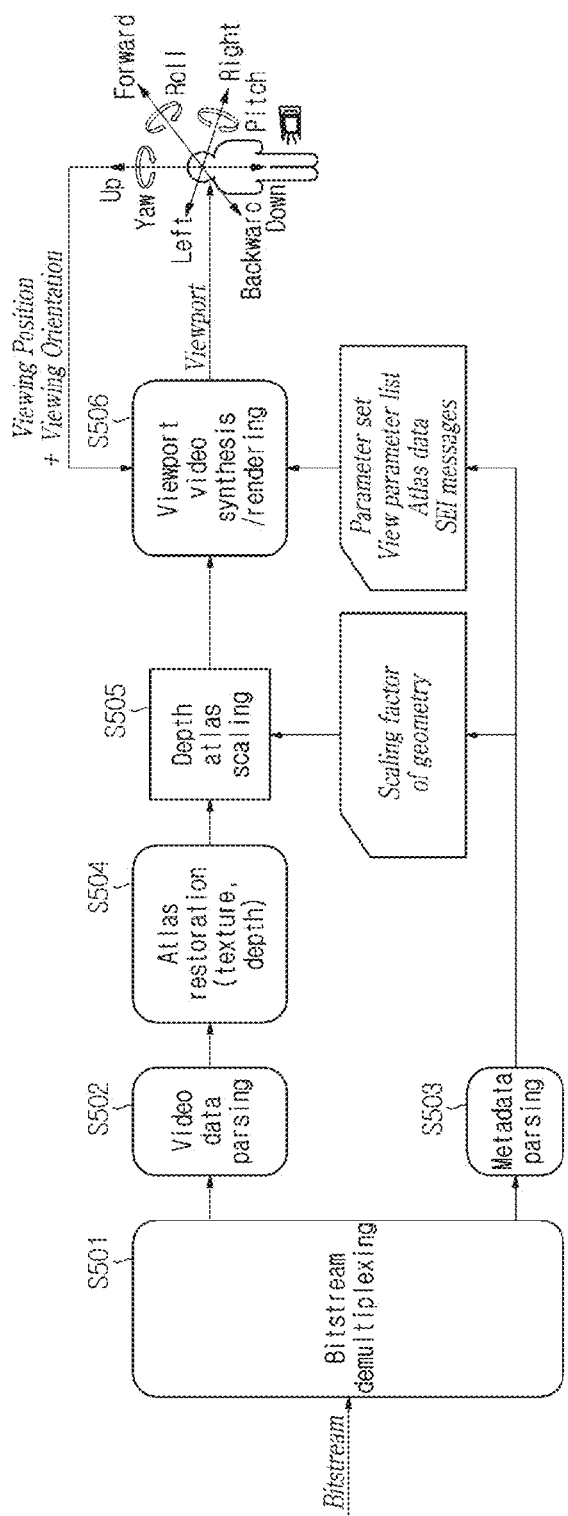
FIG. 5 is a flowchart illustrating an immersive video outputting method.

FIG. 3 and FIG. 5 illustrate flowcharts of an immersive video processing method and an immersive video outputting method respectively.

In the flowcharts below, italics or underlines indicate input or output data for implementing each step. Also, in the flowcharts below, arrows indicate the processing order of each step. Herein, when steps are not connected by arrows, it means that no temporal sequence is determined for the steps or the steps may be processed in parallel. It is also possible to process or output an immersive video in a different order from the orders described in the flowcharts below.

An immersive video processing device may receive at least one input among a multiplicity of input videos, an intrinsic camera variable and an extrinsic camera variable and evaluate depth map quality through input data (S301). Herein, an input video may consist of a pair of a texture video (attribute component) and a depth video (geometry component).

An immersive video processing device may classify input videos into a multiplicity of groups based on the positional proximity of a multiplicity of cameras (S302). By classifying input videos into a multiplicity of groups, pruning and encoding may be performed independently among neighboring cameras with a relatively coherent depth value. In addition, through the above process, a spatial random access service may become available in which rendering is performed using only information on a region that a user is viewing.

However, the above-described steps S301 and S302 are an optional process, not mandatory process that should be implemented.

When input videos are classified into a multiplicity of groups, the processes to be described below may be performed independently for each group.

The immersive video processing device may determine a priority order of pruning for view videos (S303). Specifically, the view videos may be classified into base videos and additional videos, and a priority order of pruning may be set among the additional videos.

Figure 4:
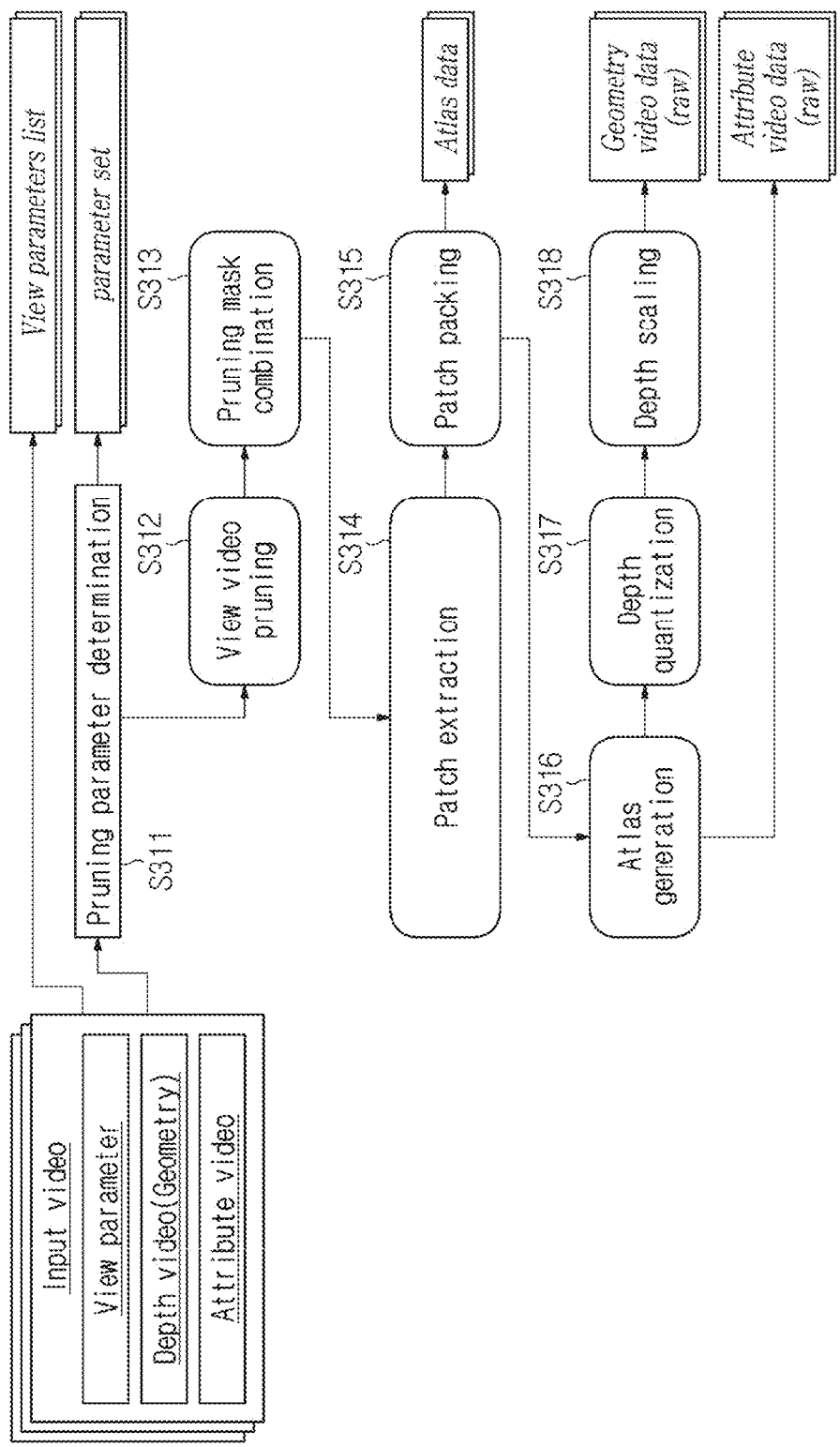
FIG. 4 is a flowchart illustrating an atlas encoding process.

Next, based on the priority order of pruning, an atlas may be generated, and the generated atlas may be encoded (S304). An encoding process of atlases is illustrated in detail in FIG. 4.

Specifically, a pruning parameter (e.g., a priority order of pruning) may be determined (S311), and based on the determined pruning parameter, pruning may be performed for the view videos (S312). As a result of pruning, a base video with highest priority is maintained as it is. On the other hand, through pruning for the additional videos, duplicate data between an additional video and a reference video are removed. Duplicate data between an additional video and a reference video may be removed through a warping process based on a depth video.

As a result of pruning, a pruning mask may be generated. When the pruning mask is generated, the pruning mask is combined every intra-period (S313). In addition, a patch may be extracted from a texture video and a depth video by using the combined pruning mask (S314). Specifically, the patch may be extracted by masking texture videos and depth videos with the combined pruning mask Herein, an unpruned view video (e.g., a base video) as a whole may be treated as one patch.

Next, the extracted patches may be packed (S315), and an atlas may be generated (S316). Specifically, a texture atlas and a depth atlas may be generated.

Also, the immersive video processing device may determine a threshold value for determining the validity and invalidity of a pixel based on the depth atlas (S317). As an example, a pixel with a value in an atlas smaller than the threshold value may correspond to an invalid pixel, and a pixel with a value equal to or greater than the threshold value may correspond to a valid pixel. The threshold value may be determined in a unit of video or be determined in a unit of patch.

In order to reduce the amount of data, the size of a depth atlas may be reduced at a specific ratio (S318). When the size of a depth atlas is reduced, information on a reduction ratio of the depth atlas (e.g., scaling factor) may be encoded. In an immersive video outputting device, a depth atlas, which is downscaled through a size of a texture atlas and a scaling factor, may be restored to its original size.

Metadata (e.g, a parameter set, a view parameter list or atlas data) generated by an atlas encoding process and supplemental enhancement information (SEI) are combined (S305). Also, a sub-bitstream may be generated by encoding a texture atlas and a depth atlas respectively (S306). Also, a single bitstream may be generated by multiplexing encoded metadata and an encoded atlas.

An immersive video outputting device demultiplexes a bitstream that is received from an immersive video processing device (S501). As a result, video data, that is, atlas data and metadata may be extracted respectively (S502, S503).

Based on parsed video data, the immersive video outputting device may restore an atlas (S504). Herein, when a depth atlas is downscaled at a specific ratio, the depth atlas may be scaled to its original size by obtaining relevant information from metadata (S505).

When a user movement occurs, an atlas required for synthesizing a viewport video according to the user's movement may be determined based on metadata, and patches included in the atlas may be extracted. The viewport video may be generated and rendered (S506). Herein, in order to synthesize the generated patches, size/position information of each patch and a camera parameter may be used.

Based on the foregoing description, a video processing method proposed by the present invention will be described in further detail.

A value, which is derived by taking the reciprocal of a distance (m) between a camera and an object, is normalized, and normalized disparity values may be mapped to depth values. Specifically, the reciprocal of the distance may be defined as a disparity expressed in metric units (1/m). Normalized disparity may be expressed by one value (e.g., depth value) within a pixel range that a pixel in a depth video may express. Herein, a normalized disparity value, which is mapped to a maximum value within the pixel range, may be defined as a maximum normalized disparity value, and a normalized disparity value, which is mapped to a minimum value within the pixel range, may be defined as a minimum normalized disparity value. As an example, in an N-bit video, a normalized disparity value, which is mapped to a pixel value of $2^N-1$ may be defined as a maximum normalized disparity value, and a normalized disparity value, which is mapped to a pixel value of 0, may be defined as a minimum normalized disparity value.

Equation 1 shows an example of conversion to each pixel value in a depth video by using a normalized disparity value in metric units (1/m).

$$\text{SampleValue} = (\text{NormDisparity} - \text{NormDispMin})/(\text{NormDispMax} - \text{NormDispMin}) * \text{MaxSampleValue} \quad \text{Equation 1}$$

In Equation 1, SampleValue represents a pixel value (that is, a depth value) in a depth atlas, and NormDisparity represents a normalized disparity value in metric units (1/m). NormDispMin represents a minimum normalized disparity value, and NormDispMax represents a maximum normalized disparity value. MaxSampleValue represents a maximum pixel range that may be expressed by a single pixel. As an example, for an N-bit video, MaxSampleValue may be set to $2^N-1$.

In order to improve depth atlas encoding/decoding efficiency, an M-bit depth atlas may be encoded by being compressed to N bits. Herein, M represents a natural number greater than N. As an example, a 16-bit depth atlas may be encoded to a 10-bit atlas. Accordingly, the range of values, which may be expressed by one pixel in the original depth atlas, is between 0 and 65535, but the range of values, which may be expressed by one pixel in the encoded/decoded depth atlas, may be between 0 and 1023.

Also, in order to improve depth atlas encoding/decoding efficiency, scaling (or quantization) for changing a depth range may be performed. Herein, the depth range may be defined as a difference between a maximum value and a minimum value among actual values of each pixel within a specific time in a depth atlas. Through the scaling, values of each pixel in a depth atlas may be adjusted to values within a limited range.

Figure 6:
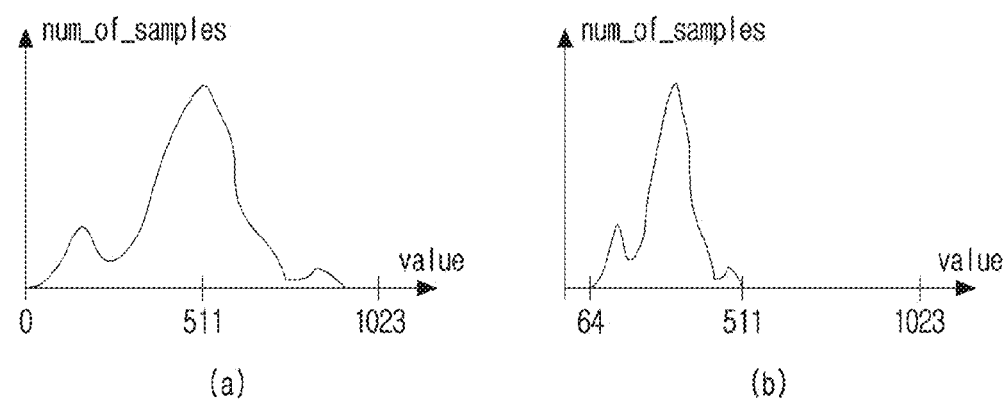
FIG. 6 is a view showing a distribution of pixel values in a depth atlas.

FIG. 6 is a view showing a distribution of pixel values in a depth atlas.

As in the example illustrated by (a) of FIG. 6, in a 10-bit video, normalized disparity values may be expressed in a value between 0 and 1023. That is, in the 10-bit video, each pixel of a depth atlas may have a value between 0 and 1023.

Accordingly, the depth range may be defined as a range between 0 and 1023. For example, when a minimum value is 12 and a maximum value is 956 among actual depth values, the depth range may be defined to be between 12 and 956.

When generating a depth atlas, normalized disparity values may be adjusted within a range between 64 and 511 by performing scaling. That is, through scaling, the depth range may be adjusted from between 12 and 956 to between 64 and 511.

As described above, when scaling is performed, the depth range of a depth atlas is changed. Accordingly, a depth range, that is, a distribution range of actual pixel values in a depth atlas may be referred to as a dynamic geometry range.

A dynamic geometry range before change (that is, a range of depth values in an original depth atlas) may be referred to as an original depth range. As an example, when an original depth atlas is a 16-bit atlas, an original depth range may be set to a range between 0 and 65535.

A dynamic geometry range after change (that is, a range of depth values in an encoded depth atlas) may be referred to as a scaled depth range. As an example, in (b) of FIG. 6, a scaled depth range may be between 64 and 511.

A dynamic geometry range may be adjusted intentionally according to time by a content creator.

Scaling for reducing a dynamic geometry range may be defined as scaling reduction, and scaling for expanding a dynamic geometry range may be defined as scaling expansion.

Through geometry range scaling reduction of a depth atlas, total bit rates may be reduced without lowering rendering quality. Such an approach may be useful especially for a natural content (e.g., a real image content) that is formed in a depth map with relatively poor accuracy. On the contrary, rendering quality may be improved through geometry range scaling expansion of a depth atlas. For example, for a computer graphics-based content with relatively good depth map accuracy, when geometry range scaling expansion is performed, the accuracy of a depth value, which may be expressed per pixel, may be increased and thus rendering quality may be improved in synthesizing a video.

Values, which are smaller than a minimum value (e.g., 64) of a scaled depth range in a depth atlas, may be used to indicate an occupancy status of a patch in the atlas. As an example, in the example of (b) of FIG. 6, a pixel having a value smaller than 64 in a depth atlas may indicate an invalid pixel. The invalid pixel indicates a pixel that is not used for video synthesis.

Depth values in a depth atlas may be linearly scaled. That is, through linear transformation, normalized disparity values may be changed to values within a modified depth range (that is, between 64 and 511).

Herein, no value greater than the maximum value (e.g., 511) of the scaled range is used. That is, no pixel having a value between 512 and 1023 exists in the depth atlas. As the range of depth values that one pixel may express is reduced in this way, a bit rate required to encode/decode a depth atlas may be reduced.

When a depth atlas is generated through scaling, rescaling (or inverse-scaling or inverse-quantization) for the decoded depth atlas may be performed in a decoder side. Through the rescaling, a normalized disparity value may be obtained from pixel values in the depth atlas. In addition, based on the normalized disparity value thus obtained, a floating position of a corresponding sample in a 3D space may be determined.

In a decoder, to perform rescaling, depth parameter information of a depth atlas may be encoded into a bitstream. As an example, the depth parameter information may include information on a minimum value and/or information on a maximum value. Herein, the information on the minimum value may indicate a minimum value of a dynamic geometry range before change (that is, a minimum value of an original depth range) or a minimum disparity value that is normalized within a predetermined time. The information on the maximum value may indicate a maximum value of a dynamic geometry range before change (that is, a maximum value of an original depth range) or a maximum disparity value that is normalized within a predetermined time.

According to time, when a dynamic geometry range is changed, depth parameter information may be updated in a predetermined time unit. Herein, the predetermined time unit may be an intra-period. That is, when a scaling factor of a depth atlas is updated, information on a minimum value and/or information on a maximum value may be encoded again. In a decoder, information on a minimum value and/or information on a maximum value may be updated in intra-period units.

Depth parameter information may further include at least one of a minimum value of a dynamic geometry range after change (that is, a scaled depth range) or a maximum value of the dynamic geometry range after change.

The above pieces of depth parameter information may be added to an atlas tile header structure.

FIG. 7 is a view illustrating an example of syntax structure including scaling-related information.

In FIG. 7, the flag ath_depth_range_change_flag indicates whether or not scaling is performed for a depth atlas. When the flag ath_depth_range_change_flag has a value of 1, the syntax ath_original_depth_range_start indicating a minimum value of a dynamic geometry range before change (that is, an original depth range) and the syntax ath_original_depth_range_end indicating a maximum value of the dynamic geometry range before change (that is, the original depth range) may be additionally encoded/decoded. The syntax ath_original_depth_range_start indicates a depth value (that is, a pixel value) mapped to a minimum value among normalized disparity values that are input for encoding for a predetermined time, and the syntax ath_original_depth_range_end indicates a depth value (that is, a pixel value) mapped to a maximum value among normalized disparity values that are input for encoding for a predetermined time.

The example of FIG. 7 illustrated that the syntax ath_original_depth_range_start indicating a minimum value of an original depth range and the syntax ath_original_depth_range_end indicating a maximum value of an original depth range are encoded and signaled. As illustrated in the example, instead of encoding a minimum value and a maximum value among depth values, a minimum normalized disparity value and/or a maximum normalized disparity value may be encoded and signaled. As an example, instead of the syntax ath_original_depth_range_start, the syntax dq_norm_disp_low indicating a minimum normalized disparity value may be encoded, and instead of the syntax ath_original_depth_range_end, the syntax dq_norm_disp_high indicating a maximum normalized disparity value may be encoded.

For a depth atlas, a syntax indicating a minimum value of a dynamic geometry range after change (that is, a scaled depth range) or a syntax indicating a maximum value of the dynamic geometry range after change may be additionally encoded and signaled.

As in the example illustrated in FIG. 7, depth parameter information may be encoded/decoded through an atlas tile header. As another example, depth parameter information may be encoded/decoded as a sequence parameter or an adaptive parameter. As an example, the depth parameter information may be included in Atlas sequence parameter set MIV extensions structure indicating parameters for an atlas sequence or be included in Atlas adaptation parameter set MIV extension structure indicating adaptive parameters of an atlas. In this case, depth atlases referring to a corresponding sequence parameter set or a corresponding adaptive parameter set may use a same depth parameter.

Alternatively, based on a 1-bit flag indicating the reliability of a depth value, whether or not a depth atlas is scaled may be signaled. As an example, when the flag has a value of 1, it means that a depth atlas is encoded without scaling, and when the flag has a value of 0, it means that a depth atlas is encoded through scaling.

As another example, in units of picture group, after depth parameter information is signaled, whether or not to redefine a depth parameter may be determined for each depth atlas.

As an example, depth parameter information may be signaled through a sequence parameter set. In addition, a 1-bit flag may be signaled in each depth atlas. When the flag has a first value, a depth parameter determined in a sequence level may be used for rescaling a corresponding depth atlas. On the other hand, when the flag has a second value, it indicates that a depth parameter is redefined for a corresponding depth atlas. When the flag has a second value, depth parameter information may be additionally signaled for a corresponding depth atlas. Specifically, for a corresponding depth atlas, information on at least one of a minimum value of an original range and a maximum value of the original range may be additionally signaled. By the additionally signaled information, a depth parameter for a corresponding depth atlas may be redefined.

When a scaled depth range is defined to be between 64 and 511, a scaled pixel value may be obtained in an encoder by scaling an original depth value, as shown in Table 1 below.

TABLE 1

```
if (ath_depth_range_change_flag) {
    for (int h = 0; h < depth.height( ); h++) {
        for (int w = 0; w < depth.width( ); w++) {
            if (depth(h, w) > 0) {
                depth(h, w) = (depth(h, w) + 0.5 −
    ath_original_depth_start) /
                        (ath_original_depth_range_end −
    ath_original_depth_start) * (511 − 64) + 64;
```

In Table 1, depth.height represents a height of a depth atlas, and depth.width represents a width of a depth atlas. h and w denote a y-coordinate and an x-coordinate of a pixel respectively. depth (h, w), which is a scaled depth value of the position (h, w), may be derived based on depth (h, w), which is a depth value of the position (h, w), ath_original_depth_start, which is a minimum value of an original depth range, and ath_original_depth_end, which is a maximum value of the original depth range. When a normalized disparity value of the position (h, w) is greater than 0, a pixel value may be obtained according to the equation described in Table 1.

In a decoder, after a depth atlas is decoded, the depth atlas with a scaled depth range may be transformed to a depth atlas with an original depth range by rescaling a pixel value.

Specifically, as shown in Table 2 below, pixel values distributed within an original depth range may be obtained by rescaling scaled pixel values.

TABLE 2

```
if (ath_depth_range_change_flag)) {
    for (int h = 0; h < depth.height( ); h++) {
        for (int w = 0; w < depth.width( ); w++) {
            if (depth(h, w) > expandedMin) {
                depth(h, w) = (depth(h, w) + 0.5 − 64) / (511 − 64) *
                    (ath_original_depth_range_end −
ath_original_depth_start) + ath_original_depth_start;
            }
```

In Table 2, expandedMin represents a minimum value (that is, 64) of a scaled depth range. When a pixel value (that is, a depth value) of the position (h, w) is equal to or greater than expandedMin, the pixel value may be rescaled according to the equation described in Table 2. Specifically, depth (h, w), which is a rescaled depth value of the position (h, w), may be derived based on depth (h, w), which is a scaled pixel value of the position (h, w), ath_original_depth_start, which is a minimum value of an original depth range, and ath_original_depth_end, which is a maximum value of the original depth range.

Figure 8:
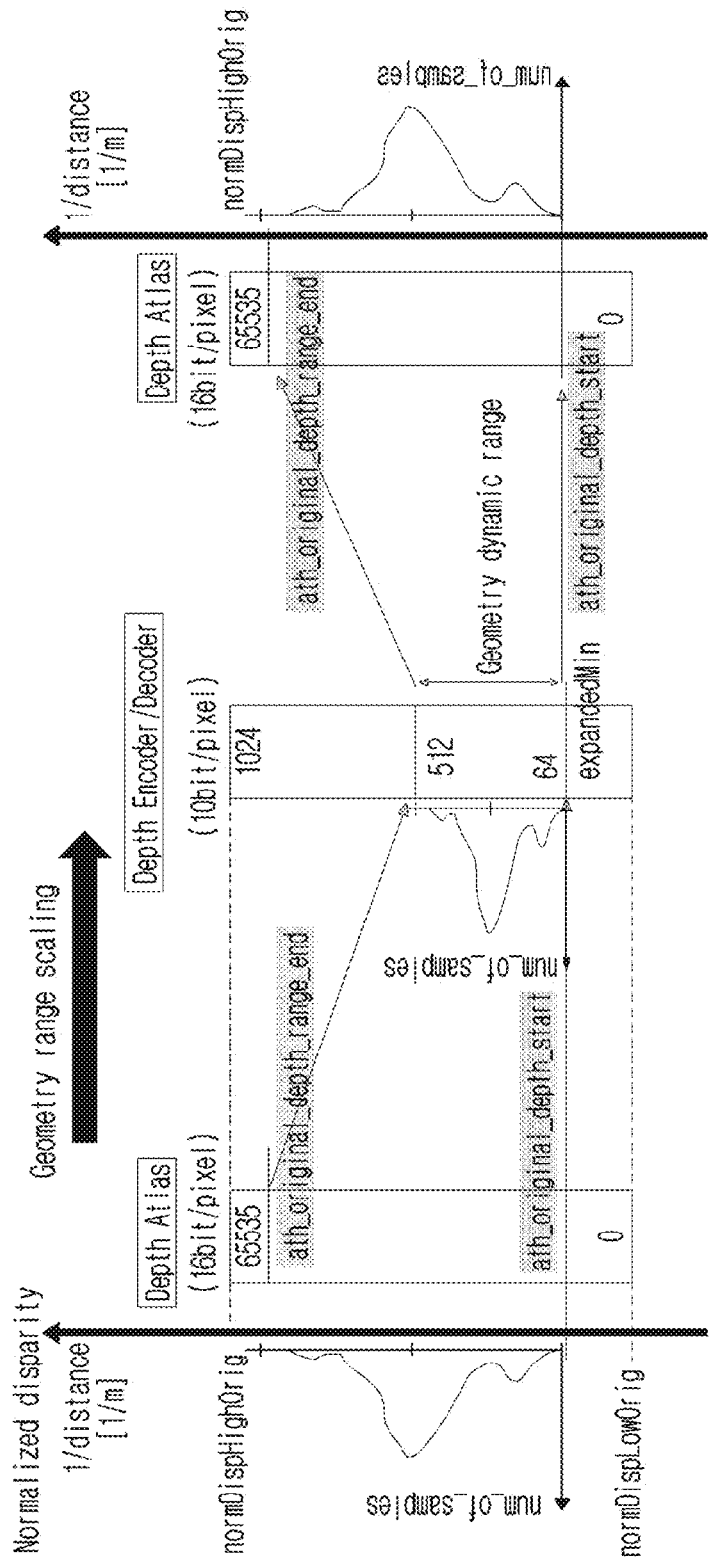
FIG. 8 is a view illustrating an example in which scaling and rescaling are performed by adjusting a depth value.

FIG. 8 is a view illustrating an example in which scaling and rescaling are performed by adjusting a depth value.

For the convenience of explanation, it is assumed that an original depth atlas is a 16-bit atlas and an encoded/decoded depth atlas is a 10-bit atlas.

The variable normDispHighOrig indicates a maximum normalized disparity value mapped to a maximum value in a range that may be expressed by one pixel in a depth atlas, and the variable normDispLowOrig indicates a minimum normalized value mapped to a minimum value in a range that may be expressed by one pixel in a depth atlas.

A value of each pixel may be derived by converting normalized disparity values, which correspond to each pixel, to depth values. In addition, information indicating a maximum value among pixel values in an original depth atlas may be encoded by the syntax ath_original_depth_range_end and be signaled, and information indicating a minimum value among pixel values in an original depth atlas may be encoded by the syntax ath_original_depth_start and be signaled.

For encoding/decoding, an original depth range may be changed to a scaled depth range. As an example, in FIG. 7, the scaled depth range is illustrated to be set between 64 and 511. Herein, the variable expandedMin indicates a minimum value of the scaled depth range.

The scaled depth range may be predefined in an encoder and a decoder. Alternatively, information indicating the scaled depth range may be additionally encoded/decoded.

In a decoder, when a depth atlas is decoded, pixel values within a scaled depth range may be restored to values within an original depth range. For example, the maximum value (that is, 511) within the scaled depth range may be converted to a value indicated by the syntax ath_original_depth_range_end, while the minimum value (that is, 64) within the scaled depth range may be converted to a value indicated by the syntax ath_original_depth_start.

Meanwhile, a pixel, of which a depth value is smaller than expandedMin, may be determined to be an invalid pixel. In this case, rescaling is not performed for the pixel.

As another example, information indicating a threshold value for determining the occupancy status of each pixel in an atlas may be separately signaled. As an example, information indicating a threshold value may be signaled for each view or each patch. In this case, expandedMin of Table 2 may represent the threshold value.

Scaling may be performed by adjusting a maximum normalized disparity value and a minimum normalized disparity value.

Figure 9:
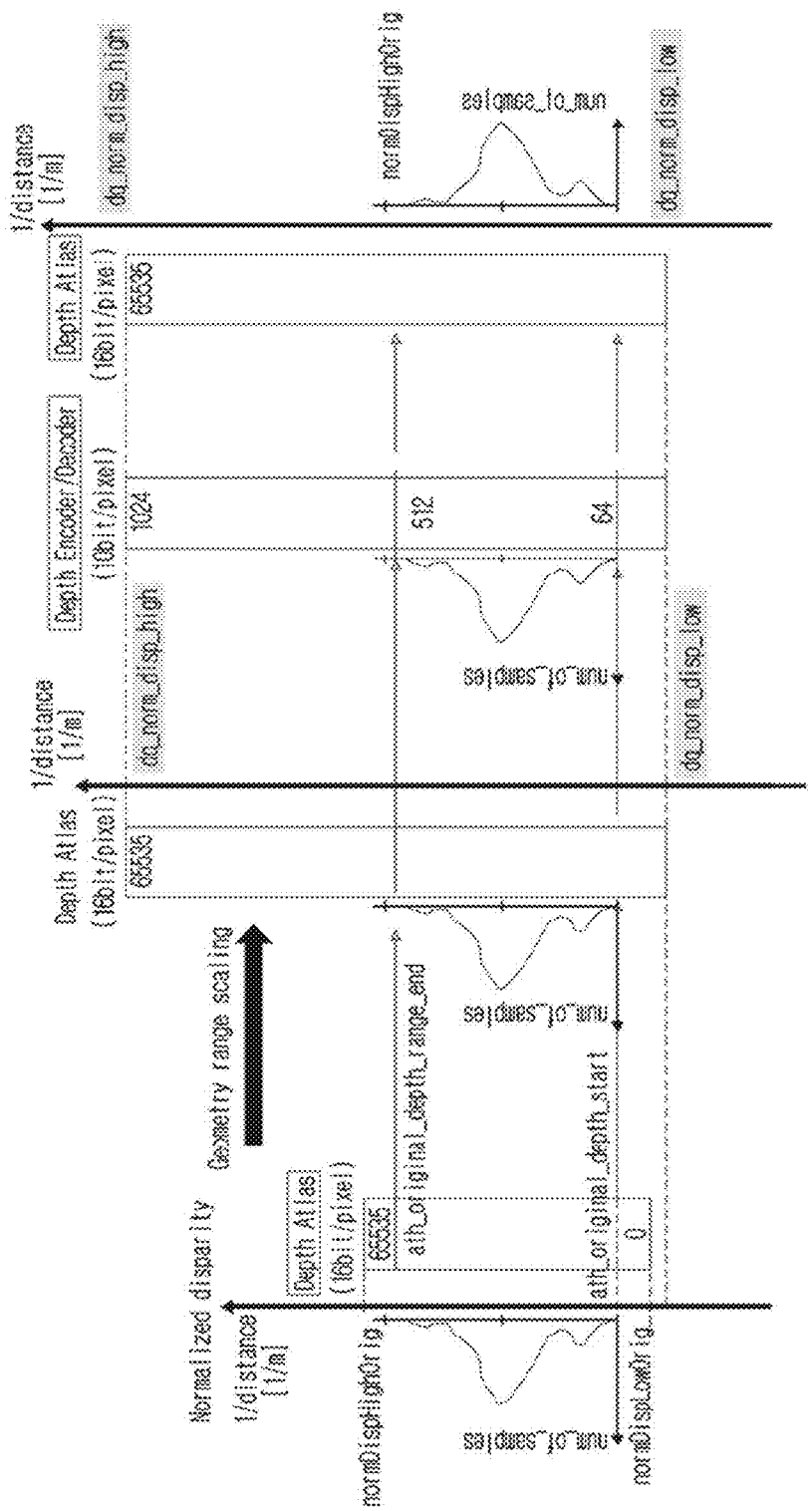
FIG. 9 and FIG. 10 are views illustrating examples in which scaling and rescaling are performed by adjusting a maximum normalized disparity value and a minimum normalized disparity value.
Figure 10:
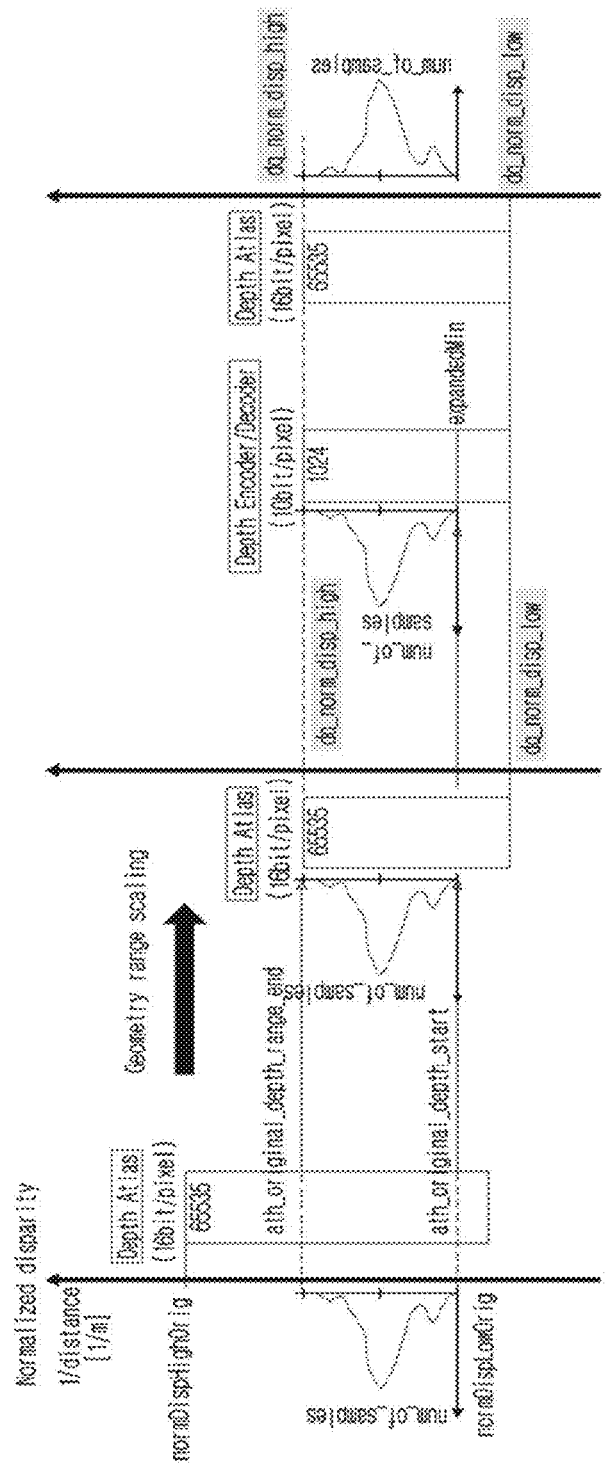

FIG. 9 and FIG. 10 are views illustrating examples in which scaling and rescaling are performed by adjusting a maximum normalized disparity value and a minimum normalized disparity value.

FIG. 9 illustrates an example in which a dynamic geometry range is scaled down, and FIG. 10 illustrates an example in which a dynamic geometry range is scaled up.

When depth values mapped to a disparity value normalized for a specific period are distributed between ath_original_depth_start and ath_original_range_end, a depth range mapped to disparity values normalized through an equation may be reduced. As an example, when a depth range is determined to be reduced to ½ of a maximum value of a pixel value that may be expressed by a pixel, a normalized disparity value corresponding to ath_original_range_end may be adjusted to be mapped to floor($2^N/2$). Herein, N represents a bit depth of a video. For example, as shown in the example of FIG. 9, in case of a 16-bit video, the value of ath_original_range_end may be changed to floor(65535/2).

As a depth value mapped to a normalized disparity value is adjusted to ½, a maximum normalized disparity value mapped to a maximum value (that is, $2^N-1$), which may be expressed by a pixel, and a minimum normalized disparity value mapped to a minimum value, which may be expressed by a pixel, may be adjusted together. Accordingly, a maximum disparity value normalized by Equation 1 may be readjusted to a value corresponding to 65535, which is a maximum value expressible in a 16-bit video, and a minimum normalized disparity value may be readjusted to a value corresponding to 0, a minimum value expressible in a 16-bit video. The maximum normalized disparity value thus readjusted may be encoded by the syntax dq_norm_disp_high and be signaled, and the minimum normalized disparity value thus readjusted may be encoded by the syntax dq_norm_disp_low and be signaled.

Next, for encoding, a 16-bit depth atlas may be compressed to 10 bits. Herein, for video encoding, the readjusted maximum normalized disparity value (that is, a value indicated by dq_norm_disp_high) may be remapped to 1023, which may be expressed by 10 bits, and the readjusted minimum normalized disparity value (that is, a value indicated by dq_norm_disp_low) may be remapped to 0.

Consequently, a dynamic geometry range may be reduced by readjusting a maximum normalized disparity value and a minimum normalized disparity value. A depth atlas with a reduced dynamic depth range may be encoded and be transmitted to a decoder. From the perspective of a video encoder and decoder, as only the reduced range (0~Floor (1023/2)) is used in the range of 0~1023, which may be expressed by 10 bits, coding efficiency may be improved. In addition, although the depth range of a decoder is reduced, as a maximum normalized disparity value and a minimum normalized disparity value are readjusted (that is, normDispHighOrg→dq_norm_disp_high, normDispLowOrig→dq_norm_disp_low), a distribution of normalized disparity values corresponding to decoded pixel values may remain within the range between an original maximum normalized disparity value (normDisHighOrig) and an original minimum normalized disparity value (normDispLowOrig).

FIG. 10 illustrates an example in which a depth range is scaled up by adjusting a maximum normalized disparity value and a minimum normalized disparity value.

When depth values mapped to a disparity value normalized for a specific period are distributed between ath_original_depth_start and ath_original_range_end, the depth distribution may be expanded through an equation. As an example, when the depth distribution is to be expanded to a maximum value (that is, $2^N-1$) expressible by one pixel, a depth value corresponding to ath_original_range_end may be adjusted to ($2^N-1$). As an example, in case of a 16-bit video, a depth value corresponding to ath_original_range_end may be adjusted to 65535.

As a depth value mapped to a normalized disparity value is adjusted to a maximum value, a maximum normalized disparity value mapped to a maximum value (that is, $2^N-1$), which may be expressed by a pixel, and a minimum normalized disparity value mapped to a minimum value, which may be expressed by a pixel, may be adjusted together. Accordingly, a maximum disparity value normalized by Equation 1 may be readjusted to a value (dq_norm_disp_high) corresponding to 65535, which is expressible by 16 bits, and a minimum normalized disparity value may be readjusted to a value corresponding to 0, a minimum value expressible in a 16-bit video. That is, in this example, a normalized disparity value corresponding to ath_original_depth_range_end may be adjusted to a maximum normalized disparity value, and a normalized disparity value corresponding to ath_original_depth_range_start may be adjusted to a minimum normalized disparity value. The maximum normalized disparity value thus readjusted may be encoded by the syntax dq_norm_disp_high and be signaled, and the minimum normalized disparity value thus readjusted may be encoded by the syntax dq_norm_disp_low and be signaled.

Next, for encoding, a 16-bit depth atlas may be compressed to 10 bits. Herein, for video encoding, the readjusted maximum normalized disparity value (that is, a value indicated by dq_norm_disp_high) may be remapped to 1023, which may be expressed by 10 bits, and the readjusted minimum normalized disparity value (that is, a value indicated by dq_norm_disp_low) may be remapped to 0.

Consequently, a dynamic geometry range may be expanded by readjusting a maximum normalized disparity value and a minimum normalized disparity value. A depth atlas with an expanded dynamic geometry range may be encoded and be transmitted to a decoder. In addition, as a pixel distribution of a depth atlas of the decoder is expanded to the range of 0~1023 expressible by 10 bits, a bit rate may increase a bit, but depth quality deterioration may be reduced by encoding/decoding. Thus, rendering with better quality may be possible in a computer graphic content requiring a precise depth value.

Consequently, as a maximum normalized disparity value and a minimum normalized disparity value are adjusted, coding efficiency or depth accuracy may be adjusted according to a feature of a content over time by adjusting only a range of a pixel value of a depth video that is encoded/decoded, without any change in the distribution of actual normalized disparity values of an original depth video.

FIG. 11 and FIG. 12 are views illustrating a difference according to whether a depth atlas scaling technique proposed by the present invention is applied or not.

(a) of FIG. 11 and (a) of FIG. 12 are examples of not applying scaling to a depth atlas, and (b) of FIG. 11 and (b) of FIG. 12 are examples of applying scaling to a depth atlas.

FIG. 13 and FIG. 14 are views illustrating a change of ED-rate according to each content when depth atlas scaling is applied.

The experimental result of FIG. 13 was derived by defining a scaled depth range to be between 64 and 511, and the experimental result of FIG. 14 was derived by defining a scaled depth range to be between 64 and 1023.

When a scaled depth range is defined to be between 64 and 511, as in the example of FIG. 13, a bit rate for every natural content may be seen to decrease through scaling of a depth video.

However, when a scaled depth range is between 64 and 511, rendering quality was seen to deteriorate in a computer graphics-based content. This is because a computer graphics-based content has a relatively large dynamic geometry range and valid depth information is damaged by applying scaling to such a computer graphics-based content.

In order to solve the problem, an experiment was conducted by expanding a scaled depth range from 64 to 1023, and FIG. 14 shows the result of the experiment.

As in the example illustrated in FIG. 14, when expanding a scaled depth range, rendering quality deterioration in a computer graphics-based content may be solved.

Based on the experimental result, adaptive determination of a scaled depth range may be considered according to the type of a content. As an example, depth range transformation in a range from 64 to 511 may be performed for a natural content, and depth range transformation in a range from 64 to 1023 may be performed for a computer graphics-based content.

In order to select a scaled depth range adaptively, information for specifying a scaled depth range may be encoded/decoded in a bitstream. As an example, a flag for selecting a scaled depth range may be encoded/decoded. As an example, the flag value of 1 indicates that the scaled depth range is set to a first range (e.g., 64~511), and the flag value of 0 indicates that the scaled depth range is set to a second range (e.g., 64~1023).

FIG. 15 is a view illustrating an experimental result of a case in which a scaled depth range is set differently according to contents.

As another example, by considering the breadth and narrowness of a dynamic geometry range, it may be adaptively determined whether or not to transform a depth range (that is, whether or not to scale a depth atlas). As an example, when a maximum value of a dynamic geometry range before change exceeds a threshold value (e.g., 900), depth range transformation (that is, scaling) may be skipped. That is, when a maximum value among depth values in a sequence is greater than a threshold value, scaling of an atlas may be skipped and the value of the syntax ath_depth_range_change_flag may be set to 0.

A depth parameter may be set separately according to each view video (that is, view) constituting an atlas. To this aim, depth parameter information may be encoded/decoded according to each view video.

In addition, according to time, a depth parameter may be adjusted in each view video. In order to support this, a depth parameter may be updated every specific time period. Herein, the specific time period may indicate a group of N pictures or an intra period. N may represent 1 or a natural number greater than 1.

In order to update a depth parameter according to each view video, information indicating whether or not to update the depth parameter may be encoded/decoded for a current period or a current picture group. The information may be a syntax indicating whether or not it is necessary to update a depth parameter for an atlas group.

As an example, the syntax may be a 1-bit flag aave_view_params_update_depth_quantization_flag. When the flag is 1, for a current atlas group, a depth parameter of each view video may be updated. On the other hand, when the flag is 0, the update of a depth parameter for a view video is not performed. In this case, a depth parameter of each view video may be set to be the same as a depth parameter of a corresponding view video in a previous atlas group.

As another example, the syntax may be an index indicating one of the parameters in an atlas group, which need to be updated. As an example, the syntax may be aame_miv_view_params_list_update_mode indicating one of a multiplicity of update modes. When the syntax indicates the update mode "VPL_UPD_DQUANT" of a depth parameter, for a current atlas group, the depth parameter may be updated according to each view video.

FIG. 16 is a view illustrating an example of syntax structure including the syntax.

When it is determined that a depth parameter needs to be updated, information for specifying a view video, for which the depth parameter needs to be updated, may be additionally encoded/decoded. As an example, in the example illustrated in FIG. 16, when the syntax aame_miv_view_params_list_update_mode indicates VPL_UPD_DQUANT, the structure miv_view_params_update_depth_quantization may be invoked.

In an encoder, based on whether or not a depth parameter of each view is the same as a depth parameter of a previous period, a value of a syntax indicating whether or not a depth parameter needs to be updated may be determined.

The structure miv_view_params_update_depth_quantization includes information for identifying a view video for which a depth parameter needs to be updated.

FIG. 17 is a view illustrating an example of miv_mive_params_update_depth_quantization structure.

In the example illustrated in FIG. 17, the syntax mvpui_num_view_update_minus1 indicates the number of view videos for which a depth parameter needs to be updated.

When the number of view videos is determined through the syntax mvpui_num_view_update_minus1, mvpui_view_idx may be signaled as many times as the determined number. Herein, the syntax mvpui_view_idx indicates an index of a view video for which a depth parameter needs to be updated.

When a view video, for which a depth parameter needs to be updated, is determined through mvpui_view_idx, a depth_quantization structure may be invoked for the view video. The depth_quantization structure includes a depth parameter for a view video of which the index is mvpui_view_idx.

FIG. 18 is a view illustrating an example of depth_quantization structure.

In the example illustrated in FIG. 18, dq_quantization_law indicates a rescaling method of a view video. As an example, when the syntax dq_quantization_law[v] is 0, it indicates that uniform or linear scaling is performed for a view video with an index of v. When the syntax dq_quantization_law[v] has a value of 0, the syntax dq_norm_disp_low[v] indicating a minimum normalized disparity value of a view video with an index of v and the syntax dq_norm_disp_high[v] indicating a maximum normalized disparity value of a view video with an index of v may be additionally encoded/decoded.

Through the above-described update function, a dynamic geometry range may be adequately changed according to the characteristic of a content. As an example, in a section where a computer graphics-based content with relatively accurate geometry information is output, the accuracy of the geometry information may be enhanced by reducing a dynamic geometry range (that is, a section between the syntax dq_norm_disp_low and the syntax dq_norm_disp_high).

On the other hand, in a section where a natural content with relatively inaccurate geometry information is output, the accuracy of the geometry information may be enhanced by expanding a dynamic geometry range.

Herein, the accuracy of geometry information indicates a depth range (or, a geometry range) expressible per a unit pixel.

That is, according to time, encoding/decoding performance/rendering performance may be improved by changing a depth range expressible per a unit pixel.

A flag indicating whether or not all the views in an atlas have a same depth parameter may be encoded/decoded. As an example, the syntax mvp_depth_quantization_params_equal_flag may be signaled for each atlas. When the syntax is 1, it indicates that every view has a same depth parameter. In this case, depth parameter information may be signaled only for a first view (e.g., a view with an index of 0). On the other hand, when the syntax is 0, depth parameter information may be signaled for each view.

The names of the syntax elements described in the above embodiments are temporarily given in order to describe the embodiments of the present invention. Different names from the ones suggested in the present invention may be given to syntax elements.

In the above-described embodiments, the methods are described on the basis of a flowchart as a series of steps or units, but the present invention is not limited to the order of steps, and some steps may occur in a different order or at the same time as other steps as described above. In addition, those of ordinary skill in the art will recognize that the steps shown in the flowchart are not exclusive, other steps may be included, or that one or more steps in the flowchart may be deleted without affecting the scope of the present invention. You will understand.

The above-described embodiments include examples of various aspects. It is not possible to describe every possible combination for representing the various aspects, but one of ordinary skill in the art will recognize that other combinations are possible. Accordingly, the present invention is intended to cover all other substitutions, modifications and variations falling within the scope of the following claims.

The embodiments according to the present invention described above may be implemented in the form of program instructions that can be executed through various computer components and recorded in a computer-readable recording medium. The computer-readable recording medium may include program instructions, data files, data structures, etc. alone or in combination. The program instructions recorded on the computer-readable recording medium may be specially designed and configured for the present invention, or may be known and available to those skilled in the computer software field. Examples of the computer-readable recording medium include a hard disk, a magnetic medium such as a floppy disk and a magnetic tape, an optical recording medium such as a CD-ROM and DVD, and a magneto-optical medium such as a floppy disk. media), and hardware devices specially configured to store and execute program instructions such as ROM, RAM, flash memory, and the like. Examples of program instructions include not only machine language codes such as those generated by a compiler, but also high-level language codes that can be executed by a computer using an interpreter or the like. The hardware device may be configured to operate as one or more software modules to perform processing according to the present invention, and vice versa.

In the above, the present invention has been described with specific matters such as specific components and limited embodiments and drawings, this is only provided to help a more general understanding of the present invention, and the present invention is not limited to the above embodiments, those of ordinary skill in the art to which the present invention pertains may devise various modifications and variations from these descriptions.

Therefore, the spirit of the present invention should not be limited to the above-described embodiments, and not only the claims described below but also all modifications equivalently or equivalently to the claims described below belong to the scope of the spirit of the present invention.

What is claimed is:

1. A method for processing an immersive video, the method comprising:
   classifying view videos into a base video and an additional video;
   performing pruning for the view videos based on the classification;
   generating an atlas based on residual view videos resulting from the pruning;
   determining depth parameters of each of views; and
   determining a pixel value in the atlas by using the depth parameters of a corresponding view,
   wherein the method further comprises encoding information indicating whether the depth parameters of at least one view is updated or not,
   wherein when the depth parameters of none of views are updated, the depth parameters of each of views are maintained as the same as those used in a previous frame, and
   wherein when the depth parameters of at least one view are updated, depth parameter information indicating updated depth parameters of the at least one view is further encoded into a bitstream.

2. The method of claim 1, wherein the depth parameters comprise a minimum normalized disparity value and a maximum normalized disparity value,
   wherein when the depth parameters of the at least one view are updated, number information specifying a number of views to which the depth parameters are updated is further encoded, and
   wherein view index information specifying an index of a view to which the depth parameters are updated is encoded as many as the number of views specified by the number information.

3. The method of claim 1, further comprising scaling the pixel value in the atlas to a value within a predefined depth range.

4. The method of claim 3, wherein the depth range is set differently according to a type of a content.

5. A method for synthesizing an immersive video, the method comprising:
   decoding an atlas;
   obtaining depth parameters of each of views; and
   obtaining a depth of a restored pixel in the atlas by using the depth parameters of a corresponding view,
   wherein the method further comprises determining whether the depth parameters of at least one view is to be updated or not,
   wherein when it is determined not to update the depth parameters, the depth parameters of the each of views are maintained as the same as those used in a previous frame, and
   wherein when it is determined to update the depth parameters, the depth parameters of the at least one view are updated by depth parameter information signaled for the at least one view.

6. The method of claim 5, wherein the depth parameters comprise a minimum normalized disparity value and a maximum normalized disparity value,
   wherein when it is determined to update the depth parameters of the at least one view, number information specifying a number of views to which the depth parameters are to be updated is decoded; and
   wherein view index information specifying an index of a view to which the depth parameters to be updated is decoded as many as the number of views specified by the number information.

7. The method of claim 5, further comprising:
   decoding a flag indicating whether or not pixel values in the atlas are scaled into a predefined depth range or not.

8. The method of claim 7, wherein the depth range is set differently according to a type of a content.

9. The method of claim 6, wherein depth parameters of a first view which is specified by one of pieces of the view index information are updated based on depth parameter information of the first view signaled therefor,
   wherein the depth parameter information comprises minimum disparity value information and maximum disparity value information, and
   wherein depth parameters of a second view which is not indicated by the pieces of the view index information are maintained as the same as those used in the previous frame.

10. The method of claim 5, further comprising:
    determining initial depth parameters of the each of views,
    wherein a flag indicating whether the initial depth parameters of the each of views are the same or not is decoded,
    wherein when the flag indicates that the initial depth parameters of the each of views are the same, initial depth parameter information is signaled only for one of views and the initial depth parameters of the others of views are set identical to the initial depth parameter of the view for which the initial depth parameter information is explicitly signaled, and
    wherein when the flag indicates that the initial depth parameters of the each of views are not the same, the initial depth parameter information is signaled for the each of views.

* * * * *